July 1, 1969 P. V. MALLOY 3,452,545

METHOD OF EARTH WORKING

Filed Oct. 22, 1965 Sheet 1 of 6

INVENTOR.
PAUL V. MALLOY
BY *Hoffmann and Yount*
ATTORNEYS

INVENTOR.
PAUL V. MALLOY
BY Hoffmann and Yount
ATTORNEYS

INVENTOR.
PAUL V. MALLOY
BY Hoffmann and Young
ATTORNEYS

*INVENTOR.*
PAUL V. MALLOY
BY Hoffmann and Yount
ATTORNEYS

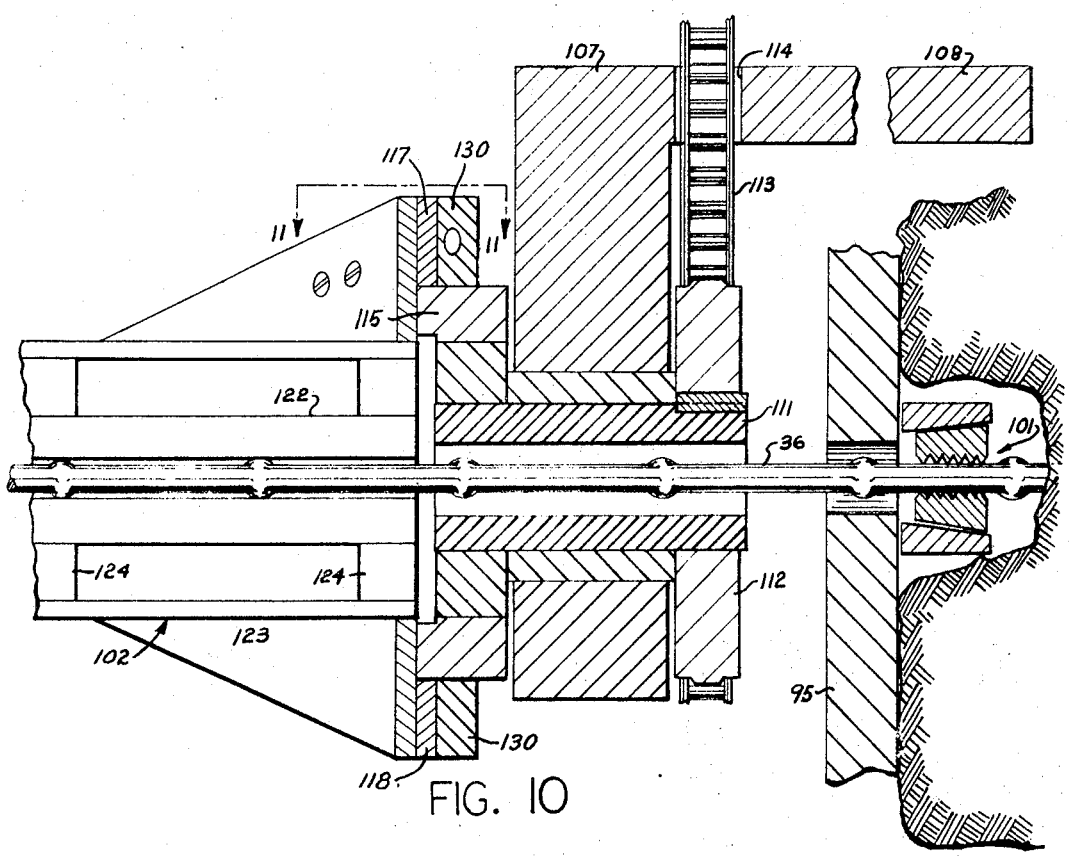
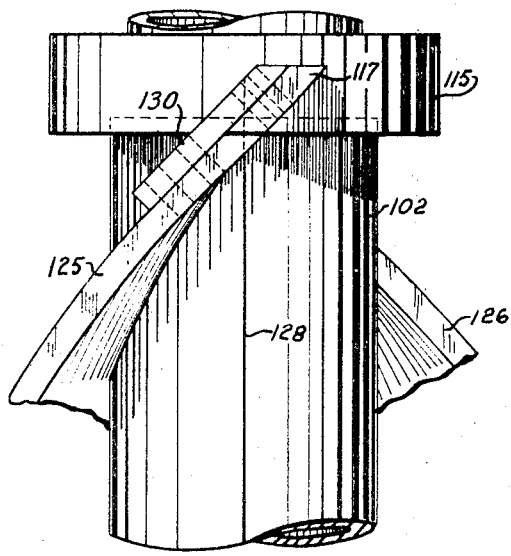
FIG. 10
FIG. 11

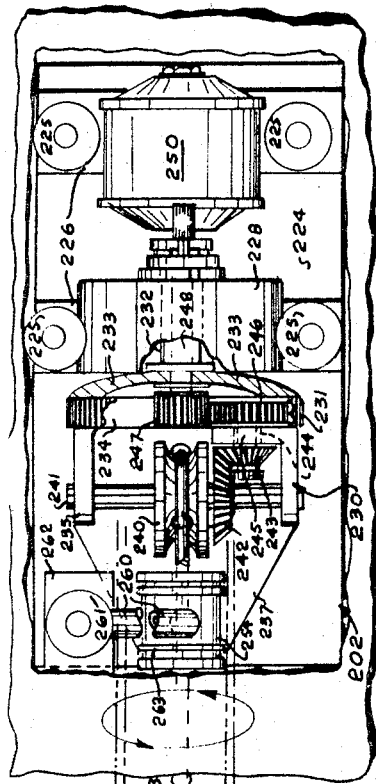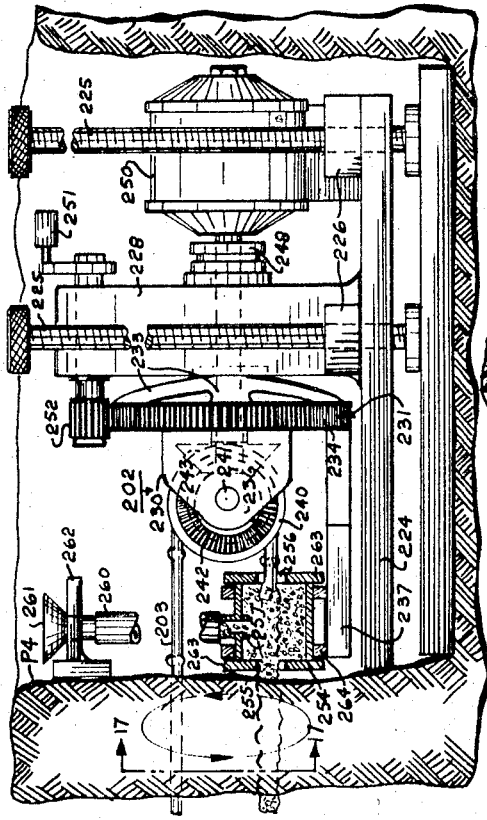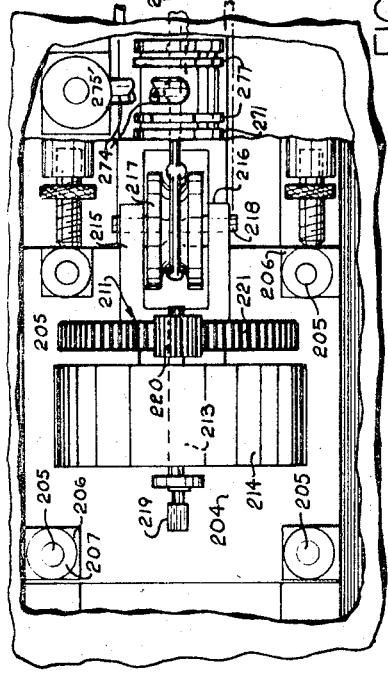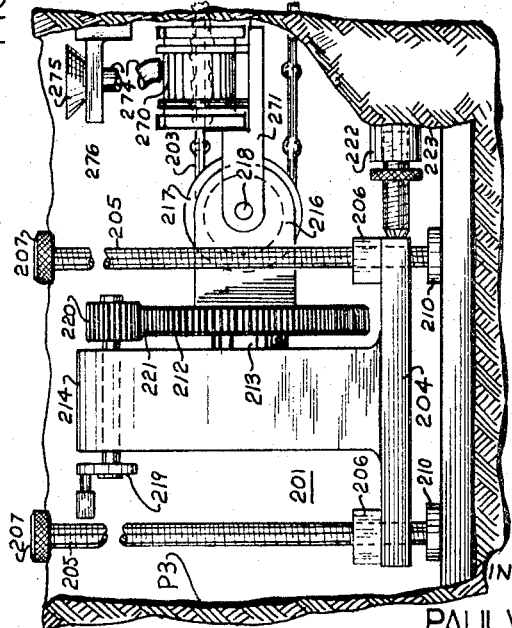
INVENTOR.
PAUL V. MALLOY
BY Hoffmann and Youst
ATTORNEYS United States Patent Office 3,452,545
Patented July 1, 1969

3,452,545
METHOD OF EARTH WORKING
Paul Vincent Malloy, 1562 Marlowe Ave.,
Lakewood, Ohio 44107
Filed Oct. 22, 1965, Ser. No. 501,625
Int. Cl. E21b *11/06;* E02f *5/06;* E01g *3/04*
U.S. Cl. 61—35                    8 Claims

ABSTRACT OF THE DISCLOSURE

An elongated flexible element provided with spaced lateral projections is moved longitudinally under tension in engagement with the earth and simultaneously, is urged laterally into the earth. Thereafter an earth moving member surrounding the element is guided thereby as it is moved longitudinally thereof to remove earth surrounding the element. Material may be applied to the element as it is moved laterally and longitudinally to fill the void created and form an impervious wall.

---

The present invention relates to a new and improved method and apparatus for earth working.

A principal object of the present invention is the provision of a new and improved method of working earth, preferably beneath the ground level, as for effecting excavations, tunneling and installation of material including walls, conduits and the like, underground and/or below grade, by the use of an elongated flexible element manipulated so as to move laterally and in some instances transversely through the earth and form a cut of a desired pattern or form and, if desired, to fill the void created by the movement of the element through the earth with material, such as concrete, grout, fertilizer, etc.

Another important object of the present invention is the provision of a new and improved method of forming an opening and/or installing a conduit underground comprising embedding an elongated flexible element underground between two locations to be connected by the opening or conduit, and applying tension to the flexible element and using it as an arbor or guide for a power driven earth removing device from one of said openings toward the other.

Other objects and advantages of the invention will be apparent from the following description of preferred earth working methods embodying the invention, reference being had to the accompanying drawings wherein:

FIG. 10 is a fragmentary sectional view taken substantially along line 10—10 of FIG. 9 and drawn on a larger scale;

FIG. 11 is a fragmentary plane view taken substantially along line 11—11 of FIG. 10;

FIG. 15 is a fragmentary plan view of apparatus for practicing another form of the invention;

FIG. 16 is a side elevational view of the apparatus shown in FIG. 15; and

FIG. 17 is a sectional view taken substantially along line 17—17 of FIG. 16.

Figure 1:
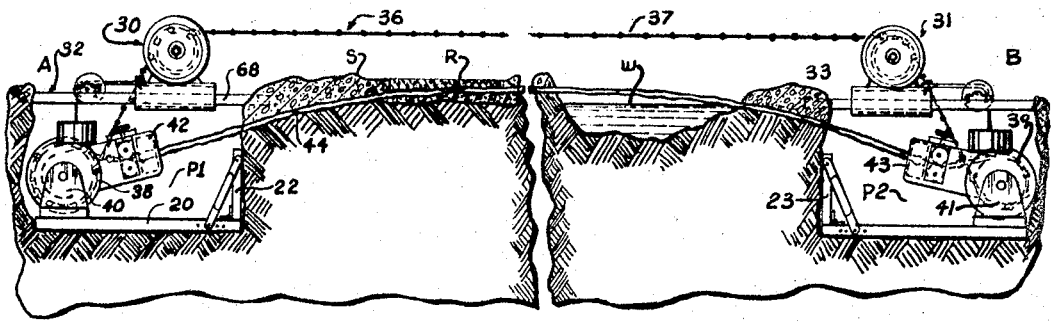
FIG. 1 is a schematic, fragmentary sectional view of terrain in which an underground conduit is to be formed according to the present invention, certain parts of apparatus of the invention being shown in side elevation.
Figure 2:
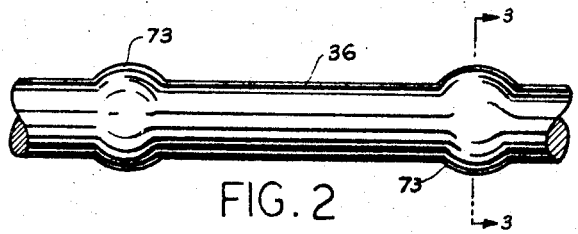
FIG. 2 is a fragmentary elevational view of the wire shown in FIG. 1 and drawn on a larger scale.
Figure 3:
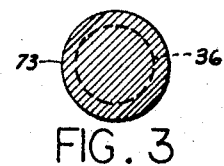
FIG. 3 is a sectional view taken on line 3—3 of FIG. 2.

Referring to the drawings, FIGS. 1 through 14 illustrate the installation of an underground conduit using the present method between locations A and B which may be some distance apart with various forms of terrane therebetween, such as a hard surface road R and a stream of water W. It is to be understood, however, that the method of the present invention and the apparatus shown and described can be employed for various other types of earth working or underground installations, for example, moving earth, forming an elongated vertical excavation or a narrow ditch, forming a vertical wall, and with slight modification a horizontal underground layer of material, for example, fertilizer. In installing the underground conduit referred to using the present invention and the apparatus shown, two pits P1 and P2 are dug at the locations A and B, respectively, to a depth slightly below the depth at which the conduit is to be installed. Platform structures 20, 21 are installed on the floors of the respective pits and are placed as at 22, 23 against the pit sides which are towards one another. Two conventional wire pulling winches 30, 31 are supported above the pits P1, P2 by suitable bridge frames 32, 33 extending across the pits. The winches 30, 31 are similar and therefore only winch 30 is described in detail. The winch 30 includes a drum 34 which may be driven in either direction by a suitable power unit 35, such as an electric or a hydraulic motor. The power winches 30, 31 have suitable common controls, which are not shown inasmuch as they are well known in the art, and which provide for operation of the two winches in concert so that one rotates in the same direction as the other and at equal speeds.

The winches 30, 31 are adapted to pull an endless wire 36 alternately in opposite directions. The upper reach 37 of the wire is wound one or two turns about the drums 34 of the winches and the portion thereof between the drums is normally supported thereby above the ground surface S. The ends of reach 37 extend from the drums 34 under and around guide pulleys 38, 39 rotatably supported on standards 40, 41 attached to the platforms 20, 21 on the bottoms of pits P1, P2, respectively. The lower or cutting reach 44 extends from the guide pulleys 38, 39 between pairs of knurled rollers 53, 54 carried by guide arms 42, 43 pivotally supported on the standards 40, 41 and which serve to guide the lower reach 44 the wire 36, tailing from pulleys 38, 39, in its ground cutting reach 44 and drawn or biased it downwardly into the ground by the subsurface positions of the guide arms and by tension applied to the wire between the winches.

Figure 5:
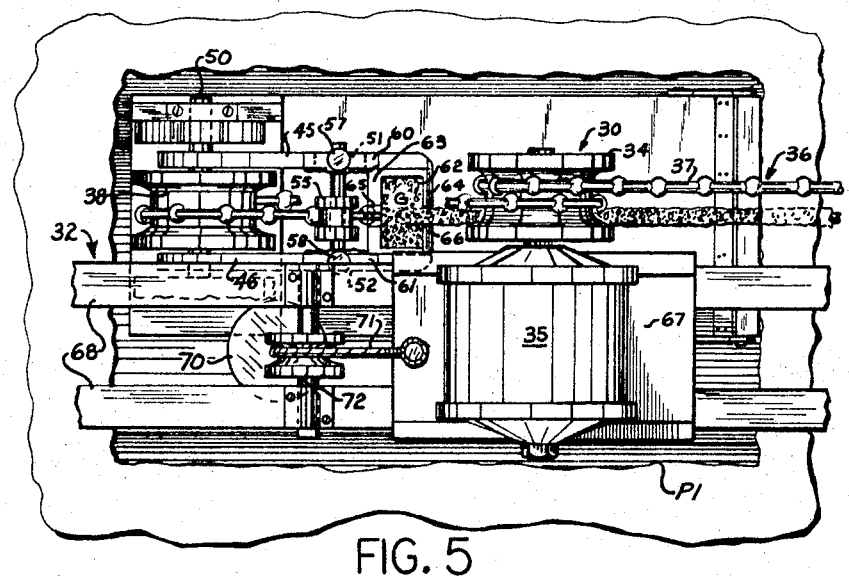
FIG. 5 is a fragmentary plan view of a portion of the apparatus shown in FIG. 1 drawn on a larger scale.
Figure 6:
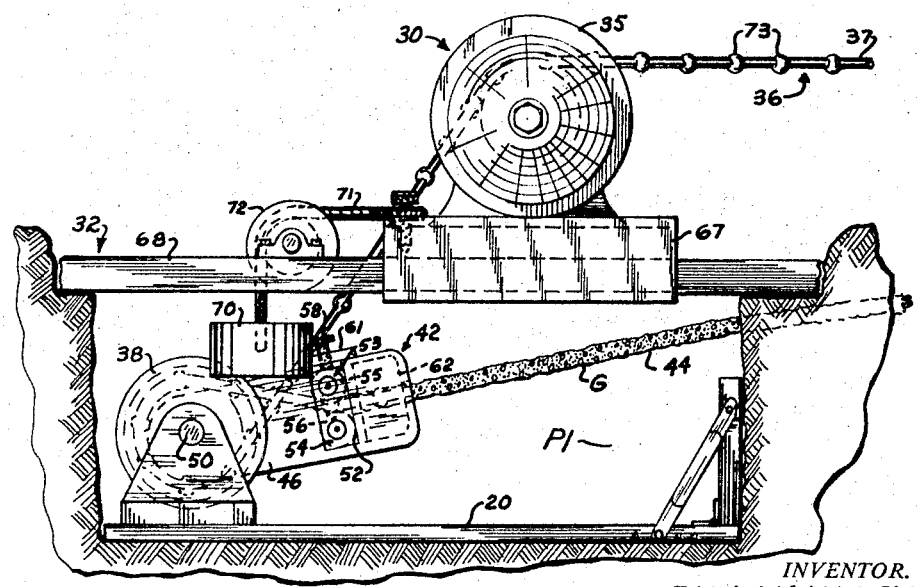
FIG. 6 is a side elevational view of the apparatus shown in FIG. 5.

The guide arms 42, 43 are similar in structure and for sake of simplicity only arm structure 42 is described in detail. Referring to FIGS. 5, 6, the arm 42 comprises two complementary, parallel bars 45, 46 which are pivotally attached at one end to a shaft 50 carried by the standard 40 and on which pulley 38 is journaled.

The sides of the bars 45, 46 have slots 51, 52 in which pairs of journal blocks 53, 54 slide and which support the axles of the knurled rollers 55, 56, respectively, between which the lower reach 44 of the wire 36 leading from the pulley 38 passes. The upper blocks 53 are urged towards the lower blocks 54 by screws 57, 58 threaded in bars 60, 61 suitably attached across the tops of the slots 51, 52 so that the screws bear against the top edges of the blocks 53. The rollers 55, 56 are knurled about their peripheries so as to remove dirt and foreign matter from the wire and to roughen the surface of the wire passing therebetween.

To maintain tension on the wire 37 extending between the winches 30, 31, the winch 30 is supported on a base 67 and is guided for movement in a direction longitudinally of the wire along two parallel guide rails 68 which form the bridge support 32, and the winch 30 is normally urged in a direction to exert a tension on the wide by a weight 70 which is attached to one end of a cable 71 riding over a pulley 72, the other end of which is attached to the base 67.

The winches 30, 31 are arranged to reverse the direction of longitudinal travel of the reach 44 of wire 36 and thereby impart a sawing action to work the wire downwardly into the ground. To provide a cutting and conveying means on the wire, a series of projections 73 are formed on the wire which are in the form of beads or nodules concentric with the wire. The projections 73 are preferably forged of the wire by heating a short length and moving the adjacent parts of the wire toward one another and their surfaces hardened in any convenient manner, to provide a tough cutting and scraping member which cuts through various material encountered by the wire on or in the ground, including concrete. For example, the wire may be formed of a chrome bearing steel and the nodules could be heated to oxidize the chrome and form a chromium oxide wear surface. The portions of the wire intermediate the nodules 73 are soft and flexible, relative to the nodules.

As mentioned previously, the wire 36 extending between the two winches 30, 31 is arranged so that the upper reach 37 thereof is supported entirely above the surface of the ground whereas the lower reach 44 is urged against the surface of the ground at the edges of the pits P1 and P2 by the arms 42, 43 and in addition, the weight of the wire causes it to bear against the ground surface between the pits. It will be seen that as the wire 36 is oscillated longitudinally through suitable strokes, the reach 44 thereof scrapes and cuts the earth and other materials and objects engaged thereby and the nodules 73 carry the cut away particles and materials along the leading side of the wire and into the pits P1 or P2 from which it may be removed. As the reach 44 of wire 36 descends into the ground by reason of the action mentioned, the arms 42, 43 lower and retain a downward bias on the wire adjacent the pit walls through which the wire is working. The additional length of wire which results from the lowering of the reach 44 to a more nearly straight line position between the pits P1, P2, is taken up by the movement of the winch drum 30 by the weight 70. It will be understood that the apparatus shown in FIGS. 1 to 6 is more or less schematic and the proportions and dimensions are not necessarily as they appear in the drawings.

It will be seen that the action of the wire 36 will cut a fine slot through the ground including the road R, and the material from the cut will be carried to the pits P1 or P2 where it may be removed in any convenient manner.

The apparatus thus far described may be used merely to convey material or to form a narrow groove or excavation. If desired a back-fill of any suitable material may be continuously effected in the void or cut created by the passage of the reach 44 of the wire 36 through the ground. In the embodiment illustrated the material removed by the wire 36 is continuously and instantaneously replaced by back-filling with grout or other suitable material of a character which sets up to form a monolithic body. For this purpose a grout box 62 is formed in each of the guide arms 42, 43 between the bars 45, 46 thereof by interconnecting end walls 63, 64 which have slots 65, 66 aligned with one another to receive the wire 36 therethrough. Grout G is placed in the boxes 52 and is fed thereinto by suitable means, not shown, to maintain a grout level in the boxes 62 of a depth to cover the wire reach 44 passing through the grout boxes towards the cut so that the wire is coated appreciably with grout which is continually carried by the wire into the cut. Grout carried into the cut by the wire is deposited on the trailing side thereof as the wire moves laterally through the ground and it is mixed with the soil particles and other granular materials of the earth and sets up as a homogeneous wall which seals off the area through which the wire has passed.

Figure 4:
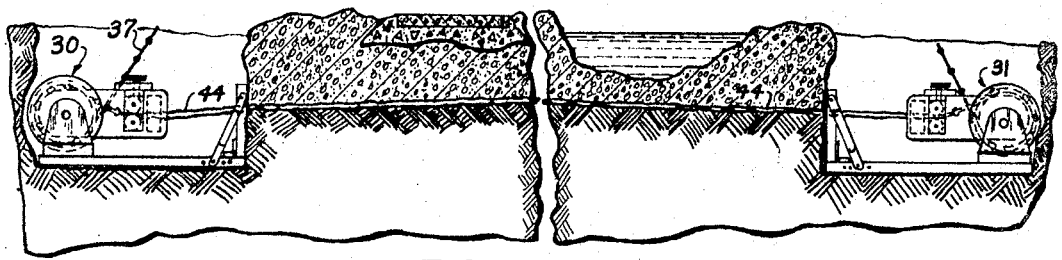
FIG. 4 is a view similar to the lower part of FIG. 1 showing operating parts of the apparatus in different positions.
Figure 7:
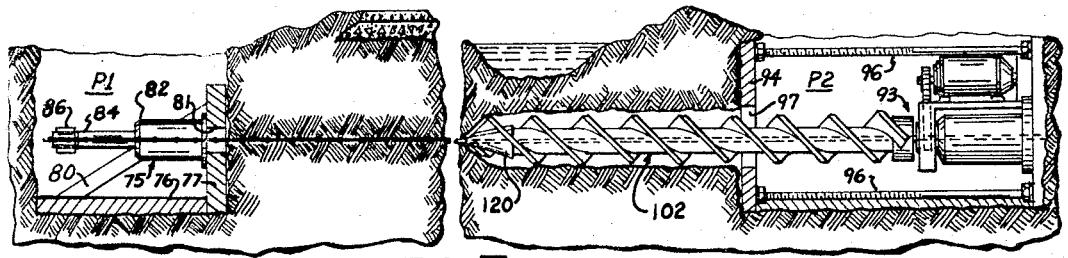
FIG. 7 is a view similar to FIG. 1 showing an intermediate step in the formation of the underground conduit.
Figure 8:
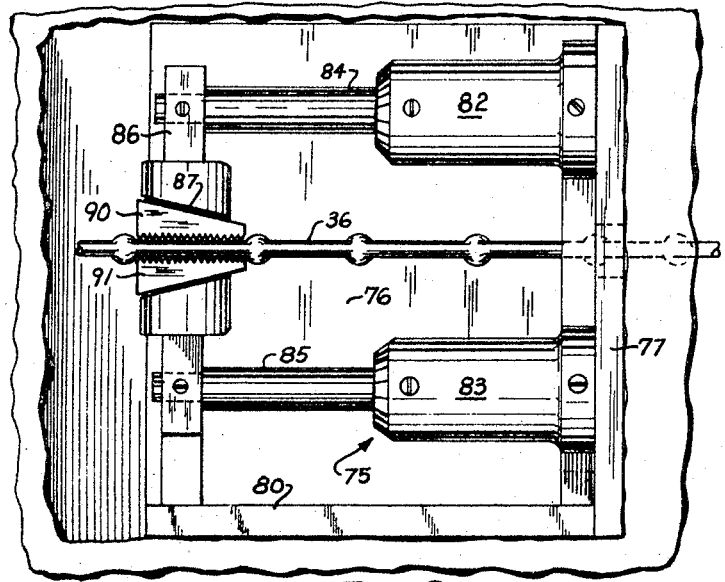
FIG. 8 is a fragmentary plan view of certain apparatus shown in FIG. 7 drawn on a larger scale.
Figure 9:
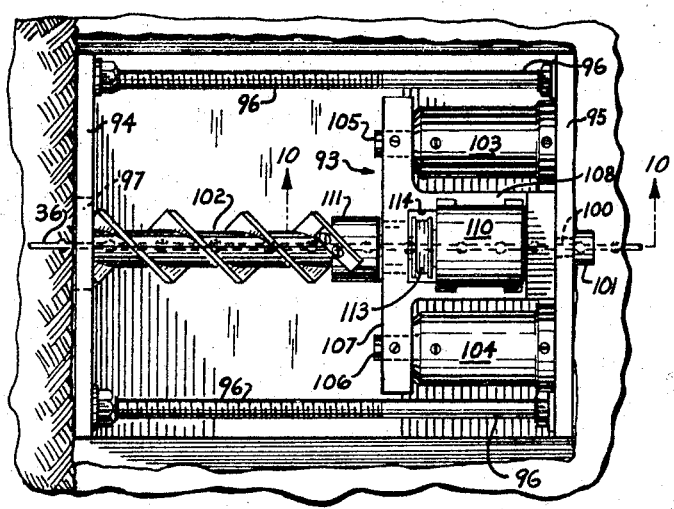
FIG. 9 is a fragmentary plan view of an earth drill shown in FIG. 7 drawn on a larger scale.

After a predetermined time the back-filling with grout may be discontinued and after the wire 36 has been operated by the winches 30, 31 so as to cause the reach 44 thereof to cut down through the earth to a substantially level position, for example, that shown in FIG. 4, the wire is severed so that the reach 44 thereof remains embedded in the earth with end portions projecting into the pits P1, P2. The winches 30, 31, pulleys 38, 39 and platforms 20, 21 are removed from the pits P1, P2. Wire tensioning apparatus 75 is thereafter placed in the pit P1 to which the end of the wire 36 extending into pit P1 is attached. Referring to FIGS. 7 and 8 the tension apparatus 75 comprises a base plate 76 which lies on the floor of the pit P1 and an upright 77 attached to one end of the base plate extends vertically against the wall of the pit P1 from which wire 36 extends and is braced by a member 80. The upright 77 has an opening 81 through which the wire 36 passes and a pair of conventional hydraulic motors 82, 83 having pistons 84, 85. The motors 82, 83 are attached to the upright 77 on opposite sides of the wire. The outer ends of the pistons 83, 84 are interconnected by a cross member 86 having a wedge-shaped recess 87 therein, in which two wire clamping jaws 90, 91 are positioned so that they grip the wire 36 therebetween, and preferably the facing surfaces of the jaws are provided with ridges to facilitate gripping of the wire. The length of the gripping jaws is such that the jaws fit between adjacent nodules 73. It will be seen that the jaws 90, 91 will grip the wire tighter as the tension on the wire increases.

The cylinders of the motors 82, 83 are connected by conduits of a suitable hydraulic system, not shown, to a source of fluid pressure including fluid controls so that the pistons 84, 85 may be forced toward the left to apply a substantial tension to the wire.

The opposite end of wire 36 is attached to a drill driving mechanism 93, see FIGS. 7, 9, 10 and 11, which comprises oppositely disposed end plates 94, 95 which engage two opposite vertical walls of the pit P2 and which are rigidly interconnected at their corners by four spacer rods 96 (only three of which appear in the drawings) having nut type expansion adjustment means, as shown. Plate 94 has an opening 97 through which the end portion of the wire 36 emerging from the side of the pit wall passes and the wire extends through an opening 100 in plate 95 and is secured in a clamp 101. The clamp 101 may be of any suitable construction to grip the wire and the body of the clamp abuts the outer side of the plate 95 adjacent the opening 100 therethrough to prevent movement of the wire by application of tension on the opposite end of the wire as described hereinbefore. For example, the clamp could be like the clamp comprising wedges 90, 91.

In addition to anchoring one end of wire 36, the apparatus 93 serves to drive a soil drill 102 along the wire 36, which, being under tension, forms a relatively stable arbor or guide for this drill. The drill driving mechanism 93 comprises a pair of hydraulic cylinder and piston motors 103, 104 having the cylinders supported at one end to plate 95 and the pistons 105, 106 thereof are attached to the yoke 107 of a platform 108. The platform 108 extends over the portion of wire 36 passing between the cylinders 105, 106 and supports a drive motor 110 which is connected to a hub 111 journaled in an opening through the yoke 107 and through which the wire 36 extends. The end of the hub 111 on the right hand side of the yoke 107 has a sprocket 112 attached thereto, which sprocket is driven by the motor 110 through a chain 113 which extends through an opening 114 through the platform 108.

The left hand end of hub 111 has a collar 115 attached thereto having two oppositely extending drive lugs 117, 118 provided with holes therethrough to receive screws for attaching segments of the drill 102 thereto, as is described more fully hereinafter.

The driving member 111 is adapted to rotate the drill member 102 which surrounds the wire 36 and is guided from pit P2 to pit P1 by the wire 36, which being under tension, forms a relatively stable guide means. The drill 102 is formed of a multiplicity of sections each separable into two semi-cylindrical parts which can be assembled together to surround the wire 36 and be attached to the driven end of the previously assembled drill as the drill progressively bores through the earth.

Figure 12:
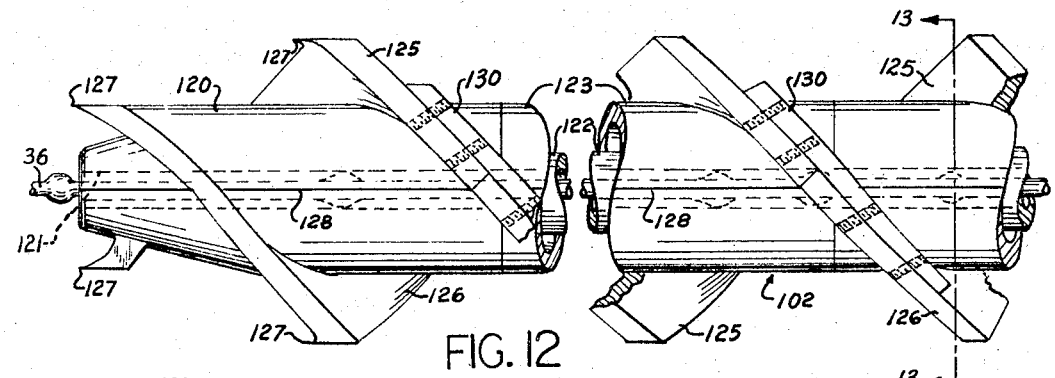
FIG. 12 is a fragmenatry side elevational view of a drill shown in FIG. 7, parts thereof being broken away.
Figure 13:
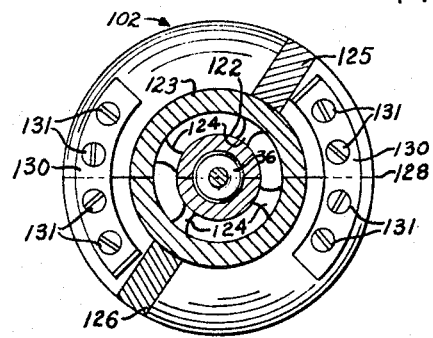
FIG. 13 is a sectional view taken substantially along the line 13—13 of FIG. 12.

Referring more particularly to FIGS. 12 and 13, the drill member 102 comprises a lead or head section 120, the leading end of which is tapered and has an opening 121 therein through which the wire 36 extends.

The lead section 120, as well as the other sections of the drill 102, comprises inner and outer tubular formations 122, 123 maintained concentric by spacers 124. Each drill section is separated longitudinally in a plane extending along the axis of the drill, the plane of separation being indicated by the line 128.

The drill 102 has a pair of continuous screw type cutting and material moving threads or flanges 125, 126 which are formed about the exterior of members 123 and are located at 180° to one another. The leading flanges 125, 126 have axially extending cutting edges 127 which serve to cut earth from the leading end of the drill member.

As mentioned previously, the drill 102 comprises any number of like sections following the lead section 120, each of which is formed of two semicylindrical sections and these sections are secured together by splice plates 130 which have the form of a short section of the threads or flanges 125, 126 and are bolted to adjacent end portions of like threads of adjacent aligned drill sections. One such splice joint is shown in FIGS. 12 and 13 in which two splice plates 130 are attached to two adjacent threads 126, 127 by screws 131. The splice plates 130 not only drivingly attach one section of the drill 102 to the next, but also secure the two halves of each section together to form the tubular drill.

The driven end section of the drill 102 is attached to the driving member 115 by two splice plates 130 one end of each being fastened to the screw flanges 125, 126 and the other end to the lugs 117, 118 respectively, the lugs being formed so that their surfaces conform to extensions of the respective flange or thread surfaces. It will be seen that the drill 102, when rotated by the drive member 115, will drill into and remove the earth surrounding the wire 36. By operating the fluid motors 103, 104, to gradually extend the pistons 105, 106 with the platform 108 supported thereon, the drive member 115 and the drill 102 are forced into the ground and along the taut wire 36 which forms an arbor or guide for the drill.

It will be appreciated that in commencing the drilling operation, the lead section 120 is assembled about the wire 36 with the pistons 105, 106 in their retracted positions, that is to say, with the platform 108 moved adjacent the plate 95. The tapered end of the drill section 120 is then assembled by joining the two semicylindrical sections together about the wire 36 and in the space between the left hand wall of the pit P2 and the drive member 111. The screw flanges 125, 126 thereof are joined by splice plates 130, bolted thereto. Splice plates 130 are then attached to the lugs 117, 118 on the drive member 111 and to the adjacent end portions of the flanges 125, 126 so that the drill 102 can be rotated by the drive member 111. The motor 110 is then energized to drive the drill and the hydraulic motors 103, 104, move the platform 108 to the left advancing the drill into the earth through a distance equal to a section of the drill. The splice plates 130 are then unbolted from the lugs 117, 118 and the pistons 105, 106 are then retracted and the two halves of a succeeding section of the drill are assembled about the wire 36 with the flanges 125, 126 thereof being bolted to the splice plates 130 from the section projecting from the pit wall and the outer end is attached to the drive lugs 117, 118 by splice plates 130 as described with reference to the initial section, and the drilling step is repeated. When the last assembled section of the drill 102 has entered the earth to substantially its full length, a next section is then assembled about the wire 36 and to the end of the drill in the manner described heretofore and the end thereof adjacent the drive member 111 is attached thereto in a manner similar to that described with reference to the former section. It will be seen that as the drill 102 is advanced it becomes extended in length until it reaches the pit P1.

After the earth has been bored by the drill 102 to form a passage 130 the drill 102 is retracted in steps by reciprocating the platform 108 by the motors 103, 104 and the successive sections of the drill are dismantled as they emerge fully into the pit P2.

Figure 14:
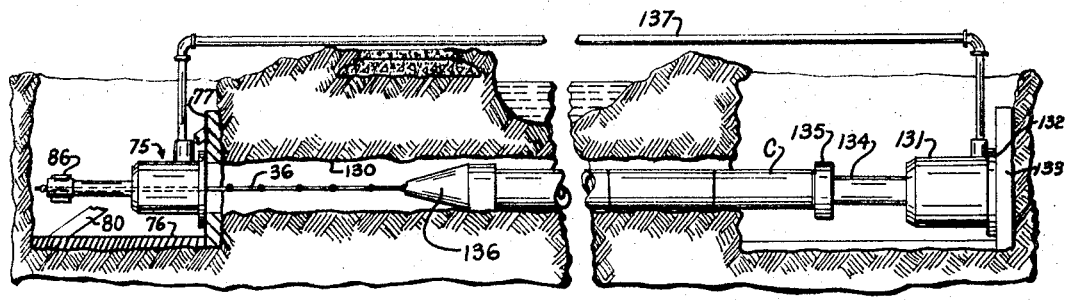
FIG. 14 is a view similar to FIG. 7, showing a further step in the installation of the conduit with parts of the apparatus shown in elevation.

After the bore 130 has been formed through the ground, the apparatus 93 is removed from the pit P2 and a hydraulic cylinder 131, see FIG. 14, having its base 132 supported on a vertically positioned plate 133 against the right hand side wall of the pit P2 is installed in the pit. The cylinder 131 has a piston therein including a piston rod 134 which has a ram head 135 on the outer end thereof for applying force to one end of a rigid conduit C for a purpose appearing more fully hereinafter.

In installing the conduit C in the bore 130 through the ground, a plurality of lengths or sections of conduit or pipe, which may be of any suitable materials, are provided, which sections can be detachably connected together at their ends as by interfitting flanges or threads (not shown), so that the conduit can be progressively assembled as it is moved in steps through the bored passage 130. Alternatively the sections may be welded together.

The leading section of the conduit C is bolted to a conical shaped nose part 136, the apex of which is attached to the right hand end of the wire 36 which was released from its anchored position in pit P2 when the apparatus 93 was removed. The conduit section with the cone formation 136 secured thereto is introduced into the opening of bore 130 in the wall of pit P2 and the wire 36 is drawn by movement of the yoke 86 by pistons 84, 85 stroking towards the left to draw the first section of the conduit into the bore. The piston 134 is retracted and a second conduit section is then attached to the trailing end of the first conduit section. Yoke 86 is drawn to the right and a fresh portion of wire 36 is secured to clamp jaws 90, 91 and the assembled conduit sections are then moved into the bore 130 by the wire 36 and the ram 134 is simultaneously operated to move the head 135 against the outer end of the last conduit section to apply an axial moving force to the conduit. It will be understood that the sections comprising condiut C are attached to one another in the pit P2 as the conduit is moved by steps through the bore 130 with pull being applied by wire 36 at the forward end of the conduit and the other end being pushed by the piston rod 134. The cylinders 82, 83 of the tensioning apparatus 75 can be synchronized with the ram cylinder 131 so that the pulling and pushing of the conduit are in unison. The means for synchronizing these operations are shown schematically by the conduit 137, and because hydraulic motor controls are well understood by those familiar with the art, the details are not shown and described.

After the conduit C has been fully extended throughout the length of the bore 130, the cone member 135 is removed and the conduit is then ready for service.

It will be seen that by the methods and apparatus described, a tunnel can be formed and a conduit can be installed therein without the necessity and inconvenience of forming a wide trench.

Another form of the invention is disclosed in FIGS. 15, 16 and 17 in which apparatus is shown for forming an underground conduit between two pits P3, P4. In forming the conduit, two wire guide and drive machines 201, 202 are placed in the pits P3, P4, respectively, which machines support an endless earth cutting wire 203, similar to wire 36. The wire 203 is actuated by the machines to cut through the ground and after reaching the desired depth is revolved about the axis of the conduit to be formed so as to describe a tubular form. Simultaneously with cutting through the earth the wire carries wall forming material, such as grout, into the cut and deposits the material behind the wire as it moves laterally. The material then sets up to form a monolithic conduit wall structure, after which the earth within the formed conduit is removed.

The machine 201 comprises a platform 204 supported at its corners by threaded legs 205 which are engaged in nuts 206 attached to the four corners of the platform in registration with openings therethrough so that the platform can be raised and lowered along the legs by rotation of the latter. The legs have knurled handles 207 by which they may be rotated, and the lower ends of the legs are pivotally supported in pads 210, only two of which appear in the drawings, which rest on the floor of the pit.

A pulley assembly 211 is supported on the platform 204 and it comprises a gear like part 212 rotatably supported by an axle shaft 213 which is suitably journaled on a frame 214 on the platform. Attached to the right-hand face of the part 212, as viewed in FIGS. 15, 16, is a pair of spaced flanges 215, 216 which support a pulley wheel 217 by a bearing shaft 218 having its ends supported in the two flanges. The pulley 217 is supported in a position in which its center is in line with the center line of the axle 213.

The pulley assembly 211 may be revolved about the axle 213 by a crank 219 which is journaled on the frame 214 and which drives a pinion 220 meshing with teeth 221 on the periphery of part 212. By turning the crank 219, the assembly 211 is revolved to rotate the pulley 217 about a center line thereof extending normal to the pulley shaft axis.

The platform 204 is braced by jacks or the like shown at 222, one end of which abuts the pit wall 223 so that the machine 201 can be forced to the left and apply considerable tension to the wire 203 extending between the machines 201, 202.

The wire guide and drive machine 202 comprises a platform 224 supported on four legs 225 which are like the legs 205 and are threaded through nuts 226 at the four corners of the platform in registration with openings therethrough and which legs are supported on pads 227 resting on the bottom of the pits P4. The platform 224 may be raised and lowered along its legs in the manner described relative to the platform 204.

A frame 228 is supported on the platform 224 and a pulley assembly 230 is rotatably journaled thereon. The pulley assembly comprises a circular gear like part 231 having a tubular axle 232, which is journaled in the frame, and spokes 233 which curve axially and support a toothed annular rim 234 in a plane beyond the end of the axle.

A pulley and grout box supporting structure is attached to the left-hand face of the part 231, as viewed in FIGS. 15, 16, and comprises two parallel spaced flanges 235, 236 having a platform 237 formed integrally therewith which projects in an axial direction from the lower edge of part 231.

A pulley 240 is attached to a shaft 241 which is journaled in suitable bearings in the flanges 235, 236 and which is rotated by a bevel gear 242 driven by a pinion 243. The pinion 243 is attached to a shaft 244 pivoted in a bracket 245 projecting from flange 236 and which shaft is driven by a gear 246 attached thereto. The gear 246 is driven by a gear 247 attached to the drive shaft 248 of an electric motor 250 which is supported on the platform 224. It is to be noted that the drive shaft 248 extends through and is concentric with the hollow axle 232 of the part 231 so that the axle 241 and the pulley 240 attached thereto can be driven by the motor 250 as the pulley assembly 230 is rotated about the axle 232. It should further be noted that the center line of the axle 232 extends through the center of the pulley 240 so that when the pulley assembly is rotated on the axle, the pulley will revolve on a central axis normal to the axis of its shaft 241.

Pulley assembly 230 is rotated by a crank 251 journaled on the frame 228 and having a pinion 252 attached to the end of the crank shaft thereof and meshing with the teeth on the rim 234.

The platform 237 of the assembly 230 supports a grout box 254 which comprises a cylindrical shaped container having central openings 255, 256 in the ends thereof through which the lower reach of wire 203 passes. A filler spout 257 is formed in one side of the grout box and has a flexible tube 260 attached thereto which leads a funnel 261 conveniently supported by a bracket 262 in a position in which grout can be fed to the box through the tube 260. In order to permit the spout 257 to remain uppermost as the pulley assembly 230 is revolved about the axle 232, the grout box is supported for axial rotation relative to the platform 237, and in the form shown this is accomplished by providing radially projecting end flanges 263 on the box which engage the outer faces of two spaced rings 264 attached to platform. The rings 264 may be split so that the grout box can be positioned on the platform and the rings then assembled thereabout.

By maintaining sufficient grout in the box 254 to cover the wire 203 passing therethrough, grout adheres to the wire and is carried into the cut formed by the wire as it passes through the ground.

Grout is similarly applied to the upper reach of wire 203 of a grout box 270 which is similar to grout box 254 and which is supported on a bracket 271 attached to the flanges 215, 216. The grout box 270 has central openings in the ends thereof through which the upper reach of wire 203 passes and grout may be continually fed to the box through an inlet having a tube 274 attached thereto which tube communicates with a funnel 275 supported on a bracket 276. The grout box 270 is rotatable about its axis relative to the bracket 271 by a ring support structure 277 which is like that described with reference to the support structure for grout box 254.

In operation, the platforms 204 and 224 are elevated to position the wire 203 above the ground surface and the pulley assemblies 211, 230 are positioned about their respective axles so that the pulleys 217, 240 are in vertical planes which is the position shown in FIG. 16. The motor 250 is then energized to drive pulley 240 which moves the lower reach of the wire 203 to the left and the upper reach is moved to the right as viewed in the drawings. The platforms are then gradually lowered so that first the lower reach then the upper reach of wire 203 enters the ground, cutting therethrough by the longitudinal movement of the wire and by reason of the lateral downward force caused by the lowering of the platforms 204, 224 into the pits P3, P4. As mentioned previously, the wire 203 is like wire 36 and has nodules spaced therealong to effectively cut through the ground and remove the dislodged earth from the cut.

To seal the cut made by the wire as it moves downwardly into the ground, grout is fed to the upper reach 203 by filling the grout box 270, the grout being deposited into the cut as the wire descends. The grout sets up, in combination with the particles of earth, and forms a hard seal.

When the wire 203 has reached the level which is desired to form the conduit, the jacks 222 are operated to force the platform 204 to the left and thereby apply a high degree of tension to the reaches of the wire 203 supported by the pulleys 217, 240. While the motor 250 drives the pulley 240 to impart longitudinal movement to the wire 203, cranks 220, 251 are rotated slowly so as to revolve the pulley assemblies 211, 231 about the axles 213, 232, respectively, which causes the two reaches of the wire to move laterally and each describe one half of a cylindrical form, which is indicated by the broken lines at 280 in FIG. 17. During this movement of the wire 203 and the pulley assemblies 211, 230, grout is applied to both reaches of the wire so that as the wire cuts through the earth the voids formed by the lateral movements of the wire reaches are filled with grout carried into the cuts on the wires. The grout so deposited, when solidified, forms a monolithic tubular wall.

It will be appreciated that a conduit wall will be formed in the manner described by rotation of the pulley assemblies through 180°, the two reaches of the wire 203 form opposite halves of the conduit. After the wire 203 has been swung 180° and the grout deposited in the cuts made thereby, the wire may be severed and removed from the conduit through the cut 281 which was formed by the lower reach of wire 203 as it was initially positioned.

After the wire 203 is removed, the grout sets up and forms a hard monolithic and impervious conduit wall structure. The earth enclosed by the formed conduit may then be removed in any suitable manner, such as by jetting water into the ends of the conduit to wash the earth therefrom.

It will be seen that the invention provides a relatively easy and efficient means of forming underground conduit without the necessity of digging a wide trench and eliminates the use of the usual conduit members inasmuch as the walls of the conduit are formed in situ—by instantaneous replacement of the earth removed by grout.

While two embodiments or forms of the invention have been shown and described in considerable detail for forming underground conduits, etc., it is to be understood that the invention is not limited to the particular embodiment referred to, for example, a wall either curved or straight could be formed by inserting a plurality of metal conduits side by side in the manner illustrated in FIGS. 1 to 6 and subsequently welded together, if desired. As an alternative to simultaneously back-filling a void produced by the flexible element the void produced by one flexible element may be back-filled by material carried thereinto by a second flexible element trailing the first in its transverse movement through the earth.

It is believed that the objects of the invention heretofore mentioned have been accomplished and it is the intention to cover hereby all adaptations, modifications of the methods and other aspects of the invention herein referred to which come within the practice of those skilled in the art to which the invention relates and the scope of the appended claims.

I claim:

1. A method of moving earth and the like comprising the steps of providing a flexible elongated element, extending an elongated section of said element longitudinally between two points, providing an earth moving means rotatably surrounding said section of said element and in engagement with the earth, applying tension to said section of said element, and rotating said earth moving means about the longitudinal axis of said section and simultaneously moving said moving means longitudinally along said tensioned section as a guide to cause said earth moving means to move such earth.

2. A method of removing earth and the like comprising the steps of providing an elongated flexible element having lateral projections spaced apart therealong, extending a section of said element between two points on the ground, moving said element longitudinally between said points while urging it laterally into the ground to cause said element to move to a predetermined position in the ground, and thereafter removing earth surrounding said element by an earth removing means guided along said element from one of said points towards the other while said element is under tension.

3. A method of earth working which comprises extending an elongated flexible element underground between two exposed points, applying tension to said element between two points therealong, moving said element laterally while imparting longitudinal movement thereto, and filling the void created by said movements of said element with material by applying said material to said element at one of said exposed points.

4. The method of forming a wall structure underground which comprises extending an elongated flexible element underground, applying tension to said element between two exposed points therealong, moving said element laterally in a closed path while imparting longitudinal movement thereto, and filling the void created by said movements of said element with a material applied to said element for forming an impervious wall.

5. A method of forming a wall structure underground which comprises extending an elongated flexible element underground, applying tension to said element between two exposed points therealong, moving said element laterally in a closed path while imparting longitudinal movement thereto, and applying a material to said element at one of said points, said material being capable of setting up to form a wall structure, said material being carried by movement of said element toward the other of said points and deposited in voids formed by said element.

6. The method of forming a layer of substitute material underground which comprises placing two generally parallel elongated elements in the earth, moving said elements laterally and in tandem while imparting longitudinal movement thereto whereby the lead element removes earth from the forward side thereof and applying a substitute material to the other element for deposit of said material at the trailing side thereof.

7. A method of removing earth and the like comprising the steps of providing an elongated flexible element having lateral projections spaced apart therealong, extending a section of said element between two earth points, reciprocating said element longitudinally while urging it laterally into the earth to cause said element to move into the earth to a desired position, and thereafter removing earth surrounding said element by an earth removing means guided along said element while said element is under tension.

8. A method of removing earth and the like comprising the steps of providing an elongated flexible element having lateral projections spaced apart therealong, extending a section of said element between two earth points, reciprocating said element longitudinally while urging it laterally into the earth to cause said element to move into the earth to a desired position, applying a solidifying material about said element as it is reciprocated, and thereafter removing earth surrounding said element by an earth removing means guided along said element while said element is under tension.

(References on following page)

References Cited

UNITED STATES PATENTS

| | | | |
|---|---|---|---|
| 574,661 | 1/1897 | Carroll | 175—53 |
| 3,232,360 | 2/1966 | Dickinson | 175—62 |
| 3,234,743 | 2/1966 | Levy | 175—53 X |
| 3,354,660 | 11/1967 | Vaughan | 61—72.2 |
| 2,142,135 | 1/1939 | Lawton | 61—72.4 |
| 2,659,211 | 11/1953 | Notarbartolo | 61—72.4 |
| 2,875,585 | 3/1959 | Little | 61—72.4 |
| 3,004,392 | 10/1961 | Symmank | 61—72.4 |

FOREIGN PATENTS

| | | |
|---|---|---|
| 179,748 | 9/1954 | Austria. |
| 93,972 | 3/1960 | Netherlands. |

EARL J. WITMER, *Primary Examiner.*

U.S. Cl. X.R.

61—722, 727; 173—43; 175—53, 62, 89; 299—35